(12) United States Patent
Souders et al.

(10) Patent No.: US 8,964,500 B2
(45) Date of Patent: Feb. 24, 2015

(54) COMMUNICATION IN A SEISMIC SENSOR ARRAY

(75) Inventors: Keith A. Souders, Tampa, FL (US); Jamal Haque, Clearwater, FL (US)

(73) Assignee: Honeywell International Inc., Morristown, NJ (US)

(*) Notice: Subject to any disclaimer, the term of this patent is extended or adjusted under 35 U.S.C. 154(b) by 1431 days.

(21) Appl. No.: 12/392,499

(22) Filed: Feb. 25, 2009

(65) Prior Publication Data

US 2010/0214871 A1 Aug. 26, 2010

(51) Int. Cl.
- *G01V 1/00* (2006.01)
- *G01V 1/22* (2006.01)
- *G01V 11/00* (2006.01)

(52) U.S. Cl.
CPC .............. *G01V 1/22* (2013.01); *G01V 11/002* (2013.01)
USPC ............................. 367/6; 367/77; 340/855.6

(58) Field of Classification Search
USPC .................... 367/21, 76, 77; 340/855.4–6
See application file for complete search history.

(56) References Cited

U.S. PATENT DOCUMENTS

| | | | |
|---|---|---|---|
| 3,074,636 A | 1/1963 | Baker et al. | |
| 3,106,982 A | 10/1963 | Wade | |
| 3,273,112 A | 9/1966 | Hobson | |
| 3,296,587 A | 1/1967 | Baker | |
| 3,302,745 A | 2/1967 | Ikrath | |
| 3,302,746 A | 2/1967 | Ikrath | |
| 3,638,178 A | 1/1972 | Stephenson | |
| 3,922,663 A | 11/1975 | Lubke et al. | |
| 3,940,733 A | 2/1976 | Johnson et al. | |
| 3,984,804 A | 10/1976 | Herring et al. | |
| 4,078,620 A | 3/1978 | Westlake et al. | |
| 4,091,366 A | 5/1978 | Lavallee | |
| 4,209,783 A | 6/1980 | Ohyama et al. | |
| 4,294,513 A | 10/1981 | Nelson et al. | |
| 4,314,365 A | 2/1982 | Petersen et al. | |
| 4,547,869 A | 10/1985 | Savit | |
| 4,589,285 A | 5/1986 | Savit | |
| 4,674,067 A | 6/1987 | Zemanek, Jr. | |
| 4,807,200 A * | 2/1989 | Montes et al. | 367/76 |
| 5,051,965 A | 9/1991 | Poorman | |

(Continued)

FOREIGN PATENT DOCUMENTS

WO 2008/042774 4/2008

OTHER PUBLICATIONS

Briscoe, H. W. "Study of the Feasibility of Long-Range Seismic Communications." 1972. Bolt Beranek and Newman, Inc., Cambridge, MA.

(Continued)

*Primary Examiner* — Krystine Breier
(74) *Attorney, Agent, or Firm* — Shumaker & Sieffert, P.A.

(57) ABSTRACT

A method, system, and apparatus for communicating data with a seismic sensor are provided. The method comprises identifying data to be transmitted and one or more seismic events that correspond to the data to be transmitted. One or more seismic events are created that are distinguishable into binary code from one or more seismic sensors within the array. Seismic events can be distinguished by their pattern or frequency. A first frequency can be assigned as a first binary code and a second frequency can be assigned as a second binary code. Likewise, different patterns of acoustic energy can designate different binary codes. Combinations of patterns and frequencies can be used together to create distinct distinguishable seismic events.

13 Claims, 12 Drawing Sheets

(56) References Cited

U.S. PATENT DOCUMENTS

| | | | |
|---|---|---|---|
| 5,136,613 A * | 8/1992 | Dumestre, III | 375/133 |
| 5,469,403 A | 11/1995 | Young et al. | |
| 5,515,509 A | 5/1996 | Rom | |
| 5,668,775 A | 9/1997 | Hatteland | |
| 5,757,728 A | 5/1998 | Tenghamn et al. | |
| 5,850,592 A | 12/1998 | Ramanathan | |
| 5,861,846 A | 1/1999 | Minter | |
| 5,924,499 A | 7/1999 | Birchak et al. | |
| 6,236,889 B1 | 5/2001 | Soykan et al. | |
| 6,274,863 B1 | 8/2001 | Kersey | |
| 6,308,137 B1 | 10/2001 | Underhill et al. | |
| 6,442,105 B1 | 8/2002 | Tubel et al. | |
| 6,469,639 B2 | 10/2002 | Tanenhaus et al. | |
| 6,583,729 B1 | 6/2003 | Gardner et al. | |
| 6,681,887 B1 | 1/2004 | Kragh et al. | |
| 6,724,319 B1 | 4/2004 | Knaack et al. | |
| 6,728,165 B1 | 4/2004 | Roscigno et al. | |
| 6,859,831 B1 | 2/2005 | Gelvin et al. | |
| 6,880,634 B2 | 4/2005 | Gardner et al. | |
| 6,928,030 B2 | 8/2005 | Chamberlain et al. | |
| 6,933,856 B2 | 8/2005 | Schultz | |
| 7,012,853 B2 | 3/2006 | Iseli et al. | |
| 7,015,694 B2 * | 3/2006 | Blumich | 324/303 |
| 7,035,240 B1 | 4/2006 | Balakrishnan et al. | |
| 7,216,053 B2 | 5/2007 | Rakkola et al. | |
| 7,301,473 B2 | 11/2007 | Shah et al. | |
| 7,304,976 B2 | 12/2007 | Mao et al. | |
| 7,307,915 B2 | 12/2007 | Kimball | |
| 7,773,457 B2 * | 8/2010 | Crice et al. | 367/80 |
| 2002/0037737 A1 | 3/2002 | Learned et al. | |
| 2004/0006430 A1 | 1/2004 | Harmon et al. | |
| 2005/0047277 A1 | 3/2005 | Chamberlain et al. | |
| 2005/0254334 A1 * | 11/2005 | Takeuchi et al. | 365/232 |
| 2005/0254344 A1 | 11/2005 | Barras | |
| 2006/0262645 A1 | 11/2006 | Van Baaren | |
| 2007/0223306 A1 | 9/2007 | Toennessen | |
| 2007/0223307 A1 | 9/2007 | Storteig et al. | |
| 2007/0286022 A1 | 12/2007 | Bull et al. | |
| 2008/0021658 A1 | 1/2008 | Pavel et al. | |
| 2008/0137476 A1 | 6/2008 | Eick et al. | |
| 2008/0159076 A1 | 7/2008 | Sicking et al. | |
| 2008/0191871 A1 | 8/2008 | Horak et al. | |
| 2009/0199072 A1 * | 8/2009 | Akimov et al. | 714/758 |

OTHER PUBLICATIONS

Chen et al., "Source Localization and Beamforming," IEEE Signal Processing Magazine, Mar. 2002, pp. 1-9.

Chen et al., "Coherent Acoustic Array Processing and Localization on Wireless Sensor Networks," Proceedings of the IEEE, Aug. 2003, pp. 1154-1162, vol. 91, No. 8.

Stafsudd et al., "Analysis, Implementation, and Application of Acoustic and Seismic Arrays," ACTA Automatica Sinica, Nov. 2006, pp. 929-937, vol. 32, No. 6.

Werner-Allen et al., "Monitoring Volcanic Eruptions with a Wireless Sensor Network," Wireless Sensor Networks: Second European Workshop on Sensor Networks, Jan. 2005, pp. 108-120.

Ammar et al., "Wireless Sensor Network Node with Asynchronous Architecture and Vibration Harvesting Micro Power Generator," Joins sOc-EUSAI Conference, Oct. 2005, pp. 1-6.

Calhoun et al., "Design Considerations for Ultra-Low Energy Wireless Microsensor Nodes," IEEE Transactions on Computers, Jun. 2005, vol. 54, No. 6, pp. 727-740.

Wills et al., "Low-Power Acoustic Modem for Dense Underwater Sensor Networks," Proceedings of WUWNet '06, Sep. 25, 2006.

U.S. Appl. No. 11/868,272, titled "Acoustic Communication and Control for Seismic Sensors", filed Oct. 4, 2007.

U.S. Appl. No. 12/331,763, titled "Event-Based Power Management for Seismic Sensors", filed Dec. 10, 2008.

* cited by examiner

COMMUNICATION IN A SEISMIC SENSOR ARRAY

CROSS REFERENCE TO RELATED APPLICATIONS

This application is related to commonly assigned U.S. patent application Ser. No. 11/868,272, filed on Oct. 5, 2007 and entitled "ACOUSTIC COMMUNICATION AND CONTROL FOR SEISMIC SENSORS" (the '272 Application). The '272 Application is incorporated herein by reference in its entirety.

This application is also related to commonly assigned U.S. patent application Ser. No. 12/331,763, filed on Dec. 10, 2008 and entitled "EVENT-BASED POWER MANAGEMENT FOR SEISMIC SENSORS" (the '763 Application). The '763 Application is incorporated herein by reference in its entirety.

BACKGROUND

Seismic sensors detect seismic activity as waves of acoustic energy that travel through or on the surface of the Earth. Various signal detection and monitoring networks deploy arrays of surface and sub-surface seismic sensors for a variety of applications where detection and processing of seismic activity is required. Communications from a seismic sensor to recording or processing devices are often done through hard connections such as electric cabling and fiber optic. In addition, sensors can communicate between each other using wireless transmission which can employ any number of methods, including radio frequency (RF).

As the functions for seismic sensor arrays increase in capability and performance and become more remote in location, increased reliability of communication between the sensors as well as communication to the recording or processing units may be required. In environments where hardwired or electromagnetic wireless communications are not feasible or are not an option (for example, in secured or clandestine signal transmission purposes), other methods of communication may be implemented. Because of the different media that smart seismic sensors have to operate over, standard modulation/demodulation techniques using carrier frequencies may not only be difficult to implement, but may be so unreliable as to make them useless. An acoustic transmitter does not currently exist to transmit data in a smart seismic sensor in a reliable manner.

SUMMARY

One embodiment provides a method of communicating data with a seismic sensor. The method comprises identifying data to be transmitted and identifying one or more seismic events that correspond to the data to be transmitted. One or more seismic events distinguishable into binary code from one or more seismic sensors within a seismic sensor array are created.

Another embodiment provides a seismic communication network comprising a plurality of acoustic sensors. Each acoustic sensor comprises one or more seismic transmitters operable to create acoustic energy waves distinguishable into binary code, a seismic detector operable to receive acoustic energy waves, and a central processing unit operable to distinguish received acoustic energy waves into binary code.

A further embodiment provides a computer program product, comprising a computer readable medium. The computer readable medium has instructions stored thereon for a method of operating a seismic sensor. The method comprises operating a seismic transmitter to transmit data using acoustic energy distinguishable into binary code and distinguishing received acoustic energy into binary code.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Embodiments provide a method, system, and computer program product for acoustic communication in a seismic sensor network. This disclosure proposes the basis of a 'smart' seismic sensor with a non-modulated or primitive acoustic or seismic transmitter sending data and/or controls between sensors in a seismic sensor array.

Figure 1:
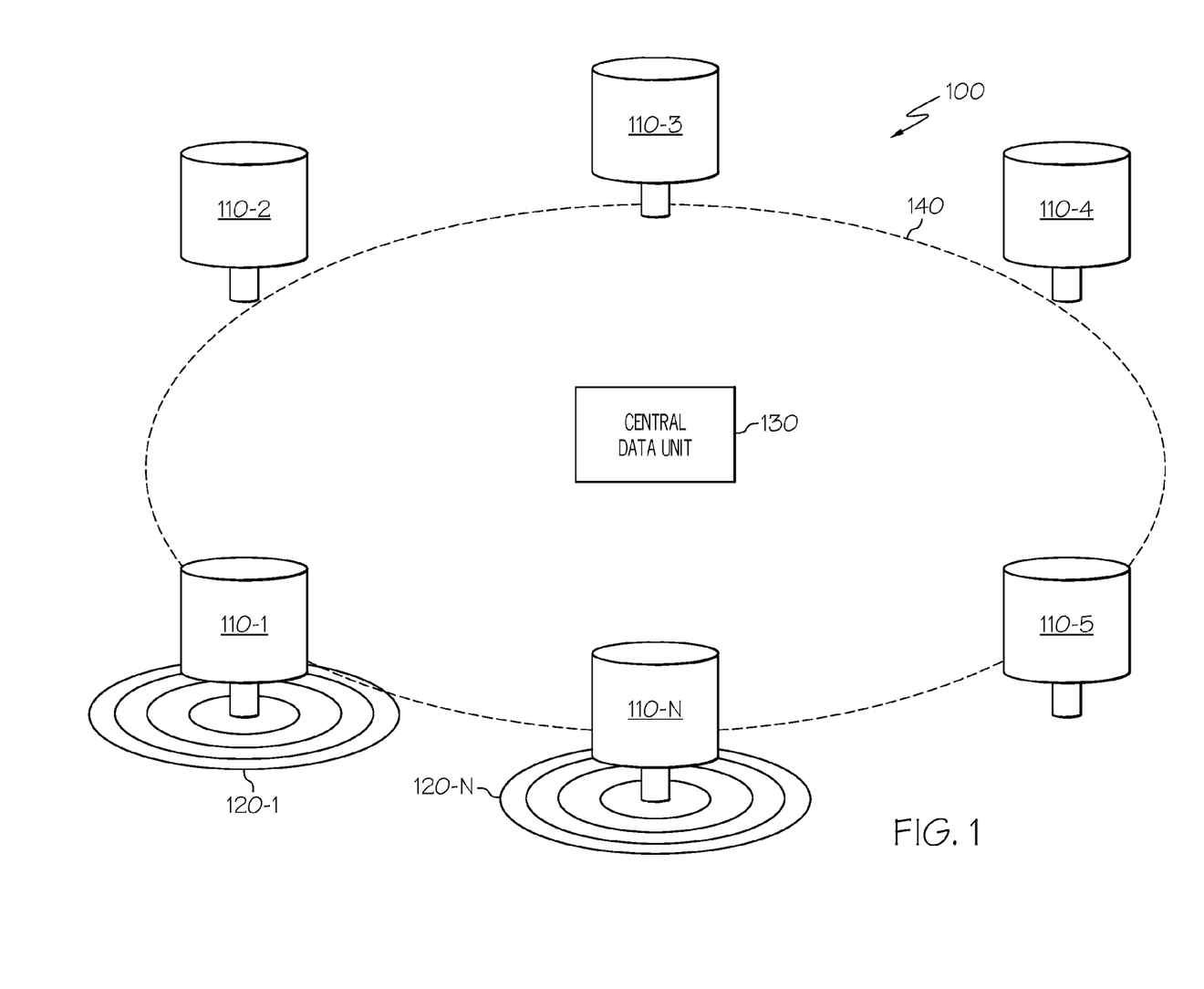
FIG. 1 is a block diagram depicting one embodiment of a seismic sensor array.

FIG. 1 is a block diagram depicting one embodiment of a seismic sensor array 100. The sensor array 100 comprises the seismic sensors 110-1 to 110-N and a central data unit 130. A seismic sensor is a sensor that detects seismic activity as waves of energy that travel through a medium, such as the Earth. Seismic waves 120-1 through 120-N are generated by the seismic sensors 110-1 through 110-N, respectively. The sensors 110 are deployed in a geographic area, on or below the Earth's surface, or even inside a structure. The sensors 110 of the seismic sensor array 100 are placed in a curvilinear fashion around a perimeter 140. The perimeter 140 can encompass a secured area (such as around a military compound), along the border between military zones, around a private business, residential area, or the like. In other embodiments, the seismic sensors 110 are placed in a random fashion.

The central data unit 130 includes a seismic sensor and is within range to detect seismic events generated by at least one seismic sensor 110. The central data unit 130 is operable to provide communication and control data to the sensors 110 in the sensor array 100. In another embodiment, the central data unit 130 is communicatively coupled to at least one of the sensors 110 in the sensor array 100 through an electrical or wireless connection, and the central data unit 130 does not have to be within range of any seismic sensor 110.

The sensors 110 may be separated from each other by a distance over which the seismic waves generated by a seismic sensor 110 are detectable. Each seismic sensor 110 is within communication range of at least a second seismic sensor 110. In one embodiment, the sensors 110 are separated by hundreds of feet. As shown in FIG. 1, the sensor 110-1 is transmitting an acoustic wave 120. Sensors 110-2 and 110-N are located within the range of seismic sensor 110-1, and thus can detect seismic events created by sensor 110-1. Sensor 110-N is also shown transmitting in FIG. 1. However, any sensor 110 can transmit seismic waves. The timing of transmissions from a sensor 110 in the sensor array 100 varies based on use.

Figure 2:
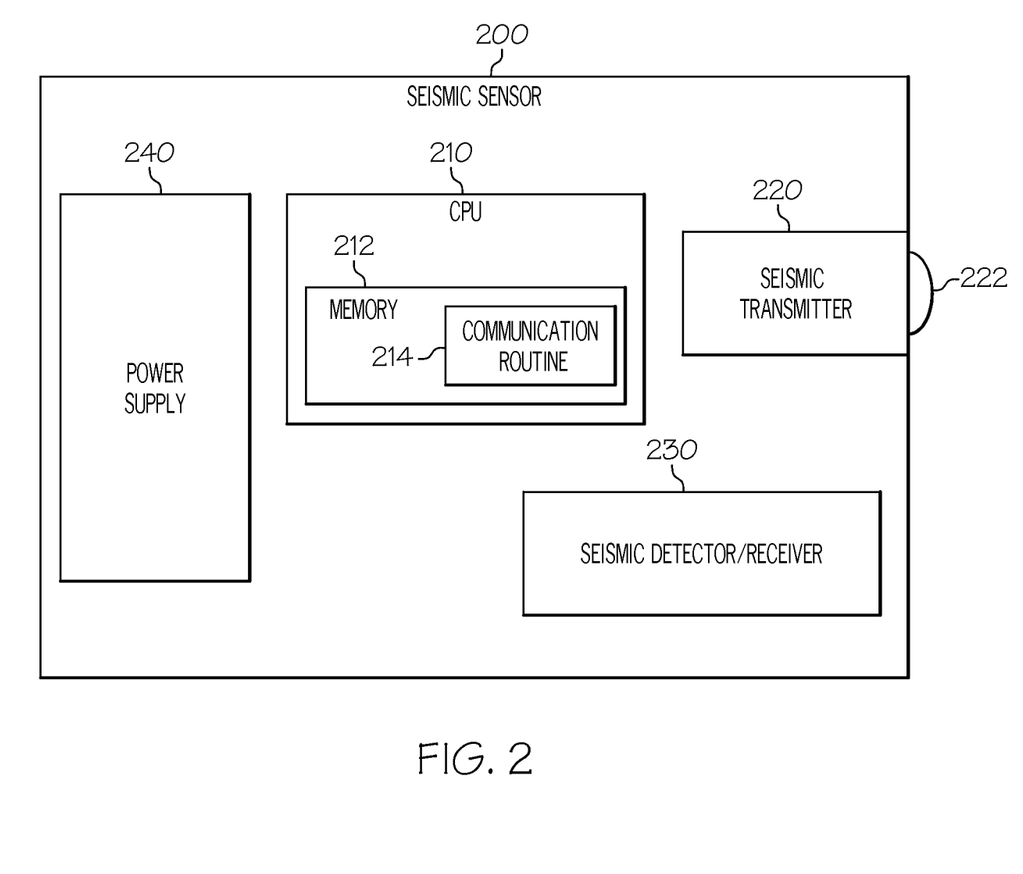
FIG. 2 is a block diagram of one embodiment of a seismic sensor.

FIG. 2 is a block diagram of one embodiment of a seismic sensor 200. The seismic sensor 200 (also referred to herein as an acoustic device, an acoustic sensor, or a sensor) is operable to generate and receive an acoustic energy wave. The seismic sensor 200 comprises a central processing unit (CPU) 210, a seismic transmitter 220, a seismic detector/receiver 230, and a power supply 240. The seismic sensor 200 is operable to provide wireless communication between seismic sensors in an array of seismic sensors.

The CPU 210 can be implemented using software, firmware, hardware, or any appropriate combination thereof, as known to one of ordinary skill in the art. By way of example and not by way of limitation, the hardware components can include one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA). In this exemplary embodiment, processing unit 210 includes or functions with software programs, firmware or computer readable instructions for carrying out various methods, process tasks, calculations, and control functions, used in seismic sensor communications. These instructions are typically tangibly embodied on any appropriate medium used for storage of computer readable instructions or data structures. In particular, in this embodiment, the instructions are stored on a memory 212.

The CPU 210 can include a memory 212 which can be implemented as any available media that can be accessed by a general purpose or special purpose computer or processor, or any programmable logic device. The memory 212 stores a communication routine 214 operable to transmit and distinguish between seismic waves intended to be a logical 1 and seismic waves intended to be a logical 0. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The CPU 210 is also operable to perform signal processing techniques on received seismic energy. For example, the CPU 210 can run filters, such as a fast Fourier transform (FFT), to resolve distinct seismic events from received seismic activity and noise. The CPU 210 is operable to determine frequency and intensity of seismic waves. The CPU 210 can be used for resolving multiple nearly simultaneous seismic events created by a seismic sensor with a plurality of seismic transponders. The CPU 210 is communicatively coupled to the memory 212. The CPU 210 is communicatively coupled to the seismic transmitter 220, the seismic detector/receiver 230, and the power supply 240. The power supply 240 is a battery for supplying power to the acoustic device 200.

Due to the environment in which the smart seismic sensors 200 are deployed, conventional means of data communication may not be reliable enough to create a standard mode of data transmission. The properties of the ground's composition (any combination of materials like dirt, sand, or gravel) have varying affect in transmission of seismic energy. These affects are similar to channel conditions experienced by traditional carrier frequency systems, for example, in air or copper wire. Rain or media compaction can shift the carrier frequency or make the carrier frequency impossible to guarantee at any frequency. Not being able to guarantee a fixed or known carrier frequency adds complexity to implementations which use traditional communication techniques such as a modem where modulation and demodulation is used. High complexity equates to more processing power which requires more electrical power. When the seismic sensors are deployed in remote locations where battery power is the only power source and longevity of that power is a priority, a low power application is desired. In addition, the communication needs to be robust and minimized to conserve available power resources. Training sequences associated with traditional modem designs take time and power. In a smart seismic sensor array, communication from one to many sensors will be quite common.

The seismic detector 230 (also referred to as a seismic receiver) detects seismic waves. Seismic waves can result from a variety of sources, such as a person or animal moving, a vehicle driving by, an earthquake, or from another seismic sensor. In another embodiment, the seismic sensor includes at least two seismic detectors, one for detecting the distinguishable seismic events from other seismic sensors in the array, and another for detecting seismic events not from other seismic sensors in the array.

The seismic sensor 200 also includes a seismic transmitter 220 operable to generate a seismic wave by any method which can generate at least distinguishable seismic events which can be detected and interpreted as logical ones and zeros. The transmission capability provides a distinct channel for the sensor 200 to transmit data and information to individual sensors or to entire arrays of sensors. A 'primitive' or basic transmitter which creates a minimum of 2 to a maximum of 2n (where n is an integer) distinct detectable seismic events representing digital 0 (zero) and digital 1 (one) provides the solution to the challenges. The maximum distinctly detectable events will be a power of 2. The seismic transmitter 220 is coupled to a transponder 222 which produces seismic energy. The transponder 222 can be configured to generate an energy wave in a plurality of ways.

In the embodiment of FIG. 2, the seismic transmitter 220 is shown to comprise one seismic transponder 222. In alternative embodiments, the seismic transmitter can comprise a plurality of transponders. For example, the seismic transmitter could be coupled to four transponders. The four transponders could each be tuned to a distinct frequency. The seismic transmitter would be able to transmit a four-bit word at once by instructing each transponder to create a seismic event at the same time. A CPU in a receiving seismic sensor would apply signal processing techniques to resolve the received seismic activity into the distinct four-bit word.

One example of an acoustic transponder 222 includes, but is not limited to, a tuned rod or tube extending from the transmitter 220 into the ground. The rod is configured to emit at least one frequency. The acoustic transmitter 220 may include more than one rod configured to emit distinct frequencies. Each seismic sensor in the array may be associated with one or a set of frequencies that is specifically tuned to an individual transmitter. Using individually tuned frequencies along with a seismic receiver's (another acoustic sensor) ability to detect and discern the frequency will provide a means of unique identity to each sensor in the sensor array. Having a unique identity for each of the seismic sensors allows each sensor in a sensor array to communicate substantially simultaneously. In addition, patterns of the energy waves will provide information. Another example of a transponder 222 is an un-tuned rod or tube extending from the transmitter 220 into the ground whose emitted frequency is not specific. Un-tuned transmitters are not identified by the frequency of the energy wave but rather by the pattern of waves they generate.

The energy waves can be generated using electrical, mechanical, and electro-mechanical means. One example is a hammer or rod strike generating energy waves. The amount of information that can be transmitted using this method is dependent on both the transmitter's ability to generate an energy wave as well as the precision and speed the receiver can detect and process the wave. The distance between sensors, makeup and density of the material the sensors are buried in, intended use, and the complexity of the communication will dictate the intensity of the energy wave. For example, medium conditions (such as compaction or soil composition) may limit or extend the spectrum of frequencies that can be used. In addition, the amount of communication data transmitted on each energy wave depends on the seismic transmitter generating the energy wave and the speed and precision of the seismic receiver detecting and processing each of the energy waves. The smart seismic sensors disclosed herein are adaptable to any number of transmission situations.

Figure 3A:
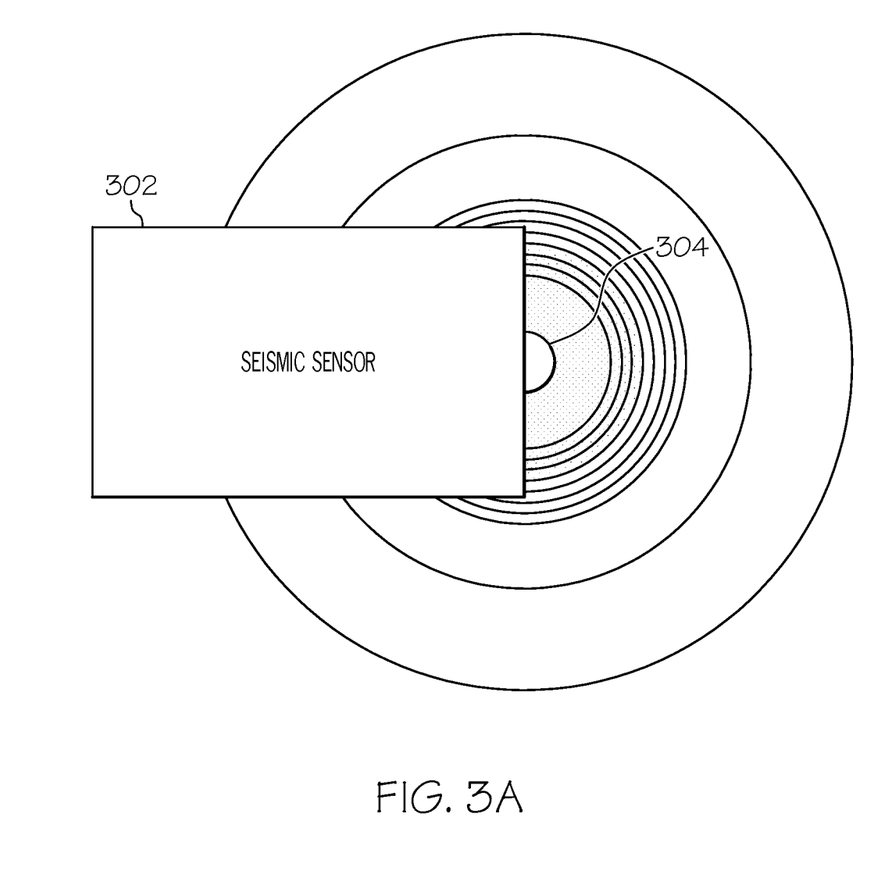
FIGS. 3A-3H are block diagrams of embodiments of a seismic sensor producing seismic events distinguishable into binary code.

FIGS. 3A-3H are block diagrams of embodiments of a seismic sensor producing seismic events distinguishable into binary code. In FIG. 3A, the seismic sensor 302 instructs the seismic transmitter 304 to produce different levels of distinguishable seismic events. The distinguishing factors may be different by their natural frequency, by their repetitiveness (that is, a pattern), or by any other means that can be differentiated to represent and be interpreted as binary code (for example, a logical '0' or '1'). The number of usable distinct events must be a power of 2 to be able to represent a logical '0' and a logical '1'. The ability of the seismic sensor 302 to generate distinguishable seismic events is indifferent of seismic mechanics. Any of the various types of mechanics that a transponder can utilize will allow a seismic sensor 302 to generate distinguishable seismic events.

Generating seismic waves of different frequencies produce distinguishable seismic events. The typical seismic frequency range is from 0 to 500 Hz. The frequency a seismic sensor uses is environmentally independent, but consideration of the distance between sensors in an array should be taken into account when determining the frequency to be used. The sensor can be configured to transmit two frequencies, one associated with a logical '1,' the other associated with a logical '0.' For example, a 00 Hz wave could be set to be a logical '0' and a 300 Hz wave could be set to be a logical '1'. As another example, 100 Hz and 200 Hz could be used. The seismic receivers would have to complement the transmitters in an array, meaning the receivers would be able to distinguish between the two frequencies and recognize a '1' or a '0.' The frequencies are distinguishable because a receiver is tuned to receive these frequencies. Any two frequencies sufficiently distinguishable by a seismic receiver can be used.

Figure 3B:
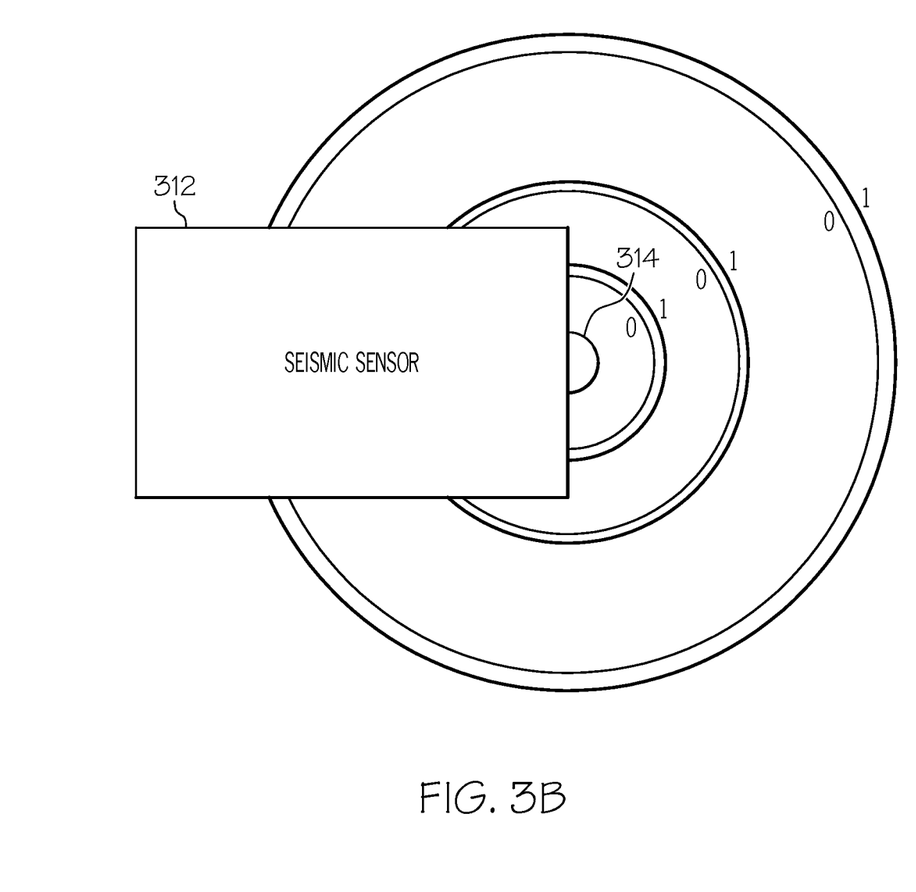

FIG. 3B shows a seismic sensor 312 producing two distinctly distinguishable seismic events. The transmitter 314 is shown to have transmitted the two distinctly seismic events three times. The result of each seismic event is a logical 1-bit symbol.

Figure 3C:
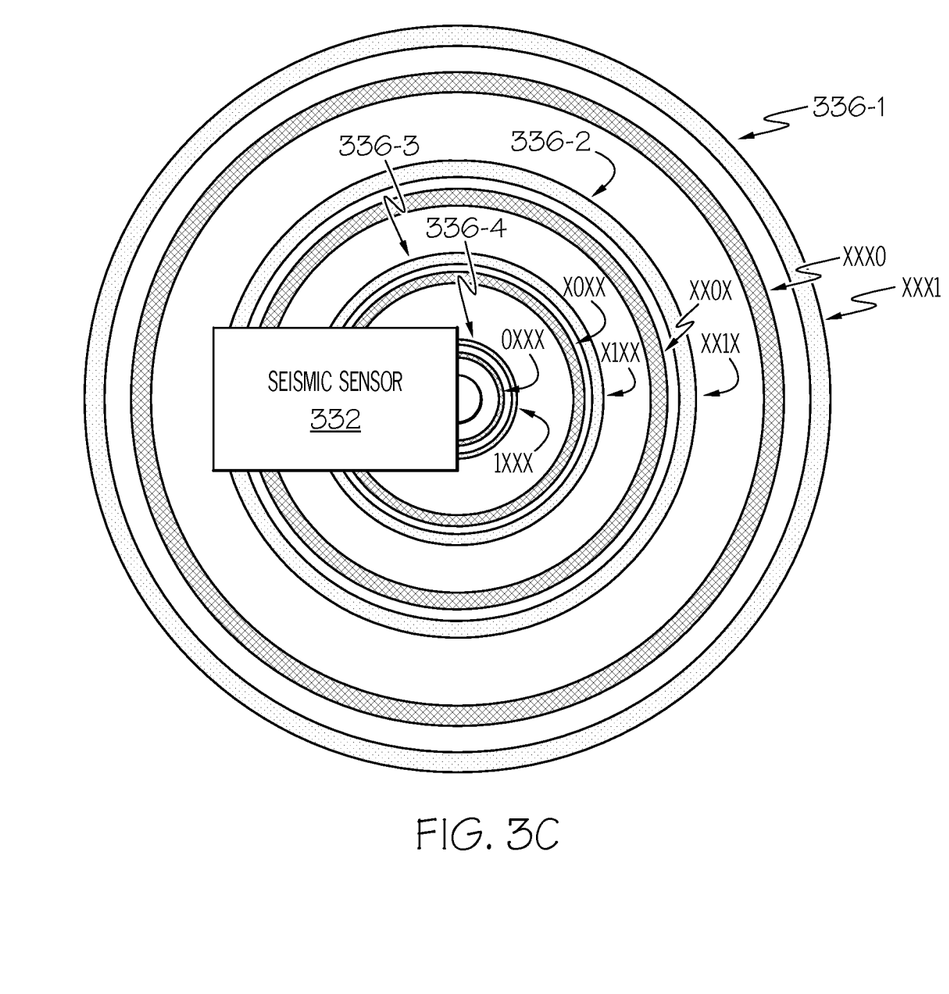

FIG. 3C shows a seismic sensor 332 comprising a transmitter 334 producing distinctly distinguishable seismic events of eight distinct frequencies to transmit a four-bit binary word. In this embodiment, the seismic sensors in the corresponding seismic array are tuned to decode a sequence of received seismic events into four bit words. The seismic events 336 are shown paired for clarity, although when transmitting, only one from each pair would actually be transmitted. The first seismic event pair 336-1, correspond to the first bit of a 4-bit word, XXX1 and XXX0. The seismic event pair 336-2 corresponds to the second bit of a 4-bit word, XX1X and XX0X. Similarly, the pair 336-3 corresponds to the third bit, X1XX and X0XX. Finally, the fourth transmitted pair 336-4 corresponds to the fourth bit, 1XXX and 0XXX. A seismic sensor that can distinguish between eight different frequencies (for example, 50, 100, 150 Hz, etc.) and transmit eight different frequencies can communicate using 4-bit words. Similarly, a seismic sensor that can distinguish between and transmit multiple patterns will be able to communicate using likewise bit words. The seismic sensor 332 creates at least one of eight distinct seismic events, wherein each of the eight distinct seismic events correspond to a digit and place in a binary 4-bit word in order to create a four-bit binary word.

Figure 3D:
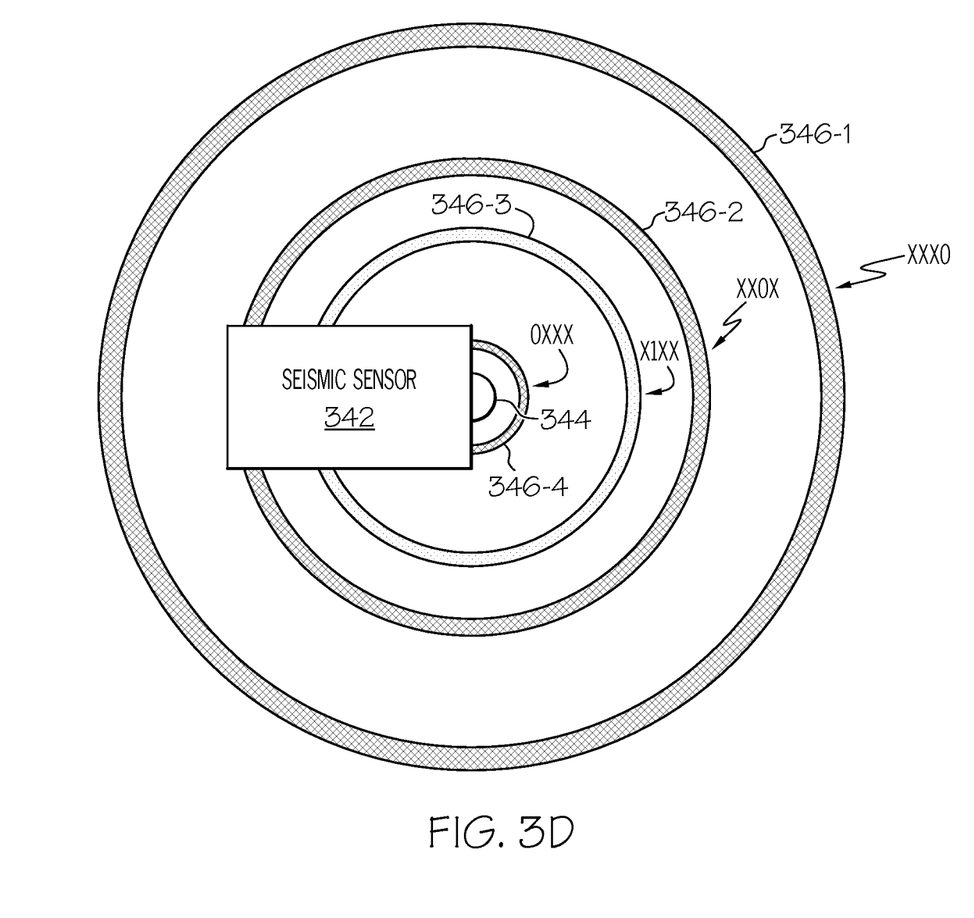

FIG. 3D shows a seismic sensor 342 with a seismic transmitter 344 producing four of eight distinct frequencies to transmit the four-bit word 0100. First, the transponder 344 creates a seismic event 346-1 distinguished in the seismic array as a logical 0 (corresponding to the dark lines). This seismic event can be of a first frequency, assigned in the seismic array to be a logical 0. Next, the transponder 344 creates another seismic event 346-2 of the first frequency. Third, a seismic event 346-3 distinguishable as a 1 is created (the light line), by creating a seismic event of a second frequency where the second frequency has been assigned in the seismic array to be a logical 1. Finally, a seismic event 346-4 of the first frequency is created. Thus, a seismic receiver in the seismic array receives these four seismic events and determines the data transmitted is a four-bit signal corresponding to 0100.

Figure 3E:
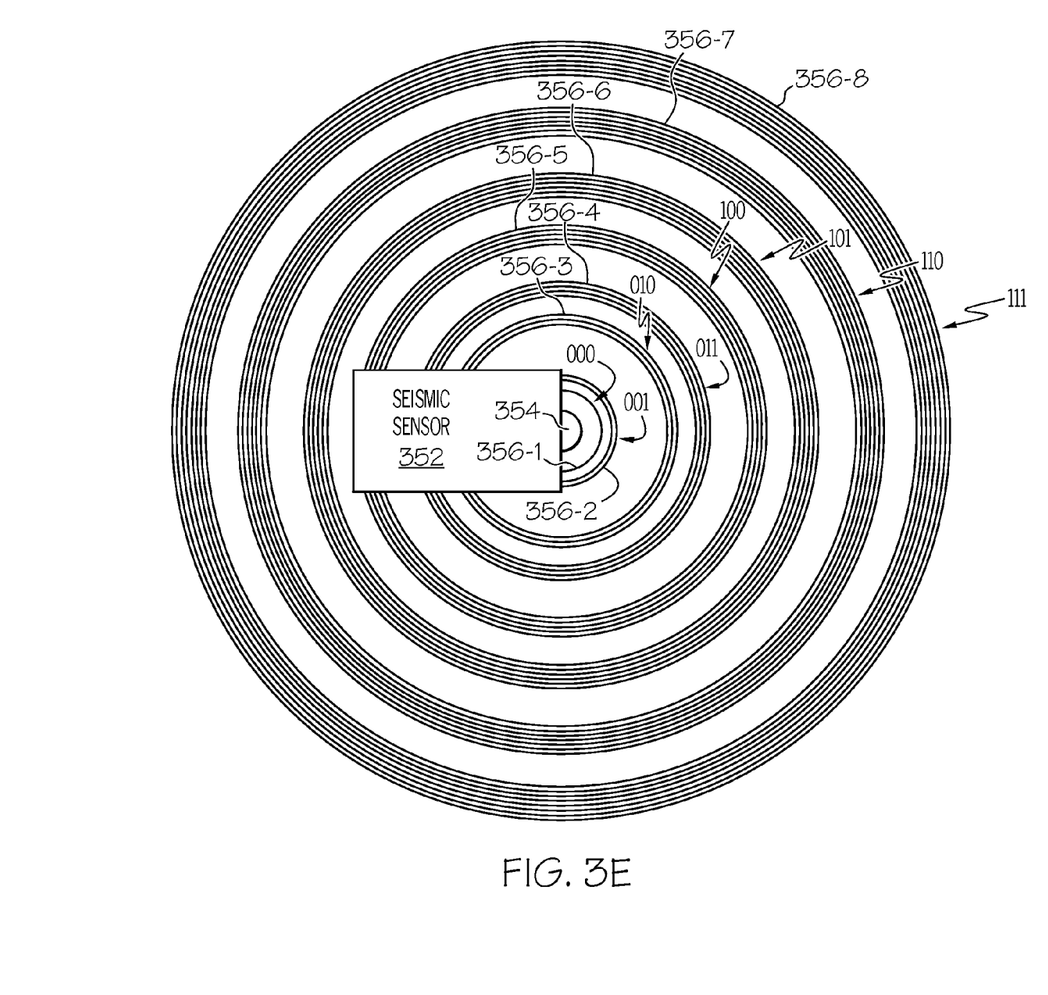

FIG. 3E shows a seismic sensor 352 with a seismic transmitter 354 producing eight distinctly distinguishable seismic patterns of a first frequency to transmit a three-bit binary word. In this example, one seismic event 356-1 corresponds to the three-bit binary word 000. Two closely followed seismic events 356-2 corresponds to the three-bit binary word 001. Three seismic events 356-3 denote 010 and four events 356-4 denote 011. Likewise, five events 356-5 denote 100, six events 356-6 denote 101, seven events 356-7 denote 110, and eight events denote 111. This is only one possible arrangement, and one skilled in the art would recognize that any assignment and pattern of seismic events is possible. Additionally, patterns of seismic events can incorporate a plurality of different frequencies.

Figure 3F:
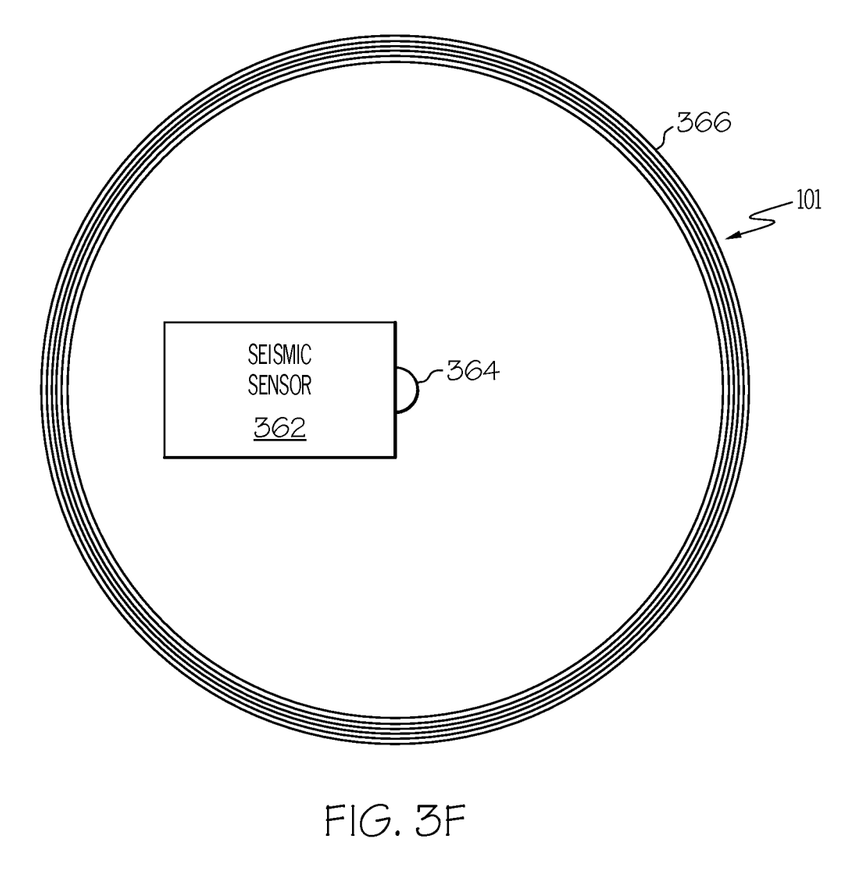

FIG. 3F shows a seismic sensor 362 with a seismic transmitter 364 producing a three-bit binary word 101 based on seismic energy patterns using the assignments from FIG. 3E. The five seismic events 366 is distinguishable into the three-bit binary word 101.

Figure 3G:
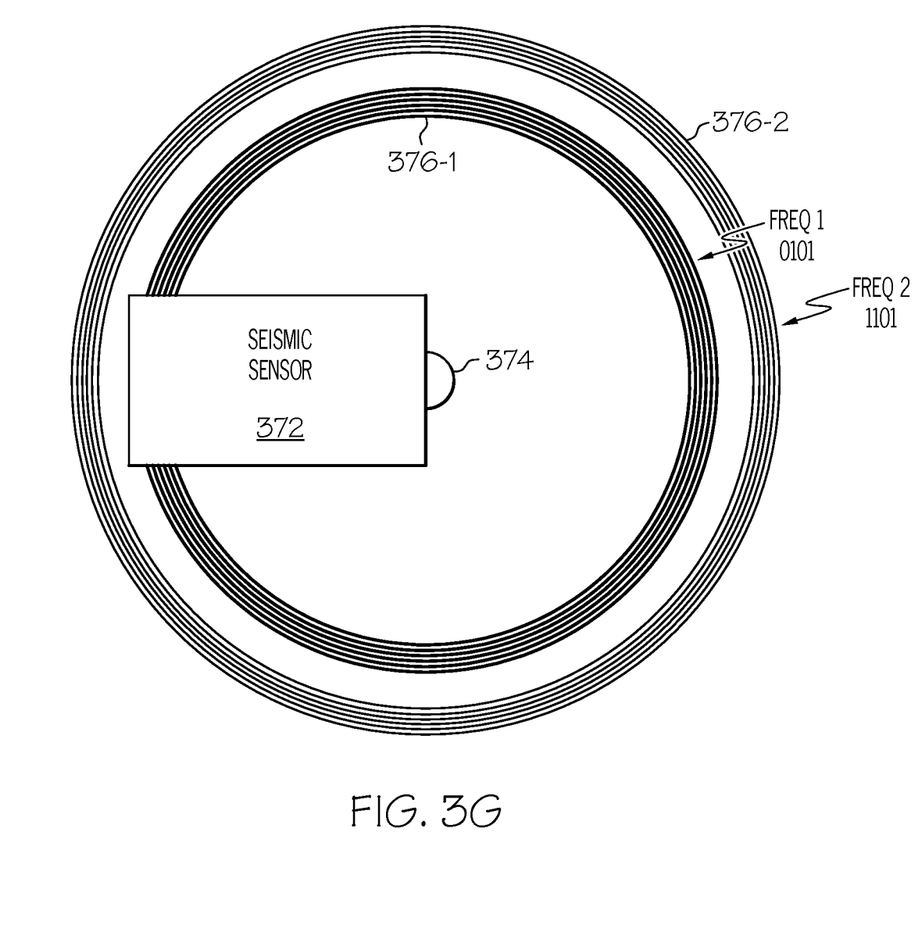

FIG. 3G shows a seismic sensor 372 transmitting two identical seismic patterns 376 at two different frequencies to transmit a distinct four-bit binary word. The five seismic events transmitted at a first frequency 376-1 denote 0101. The frequency is defined to indicate the bit in the $2^3$ place for the four-bit binary word. In this example, the first frequency indicates a 0 in the $2^3$ place. The five seismic events transmitted at a second frequency 376-2 denote 1101. The second frequency indicates a 1 in the $2^3$ place.

Figure 3H:
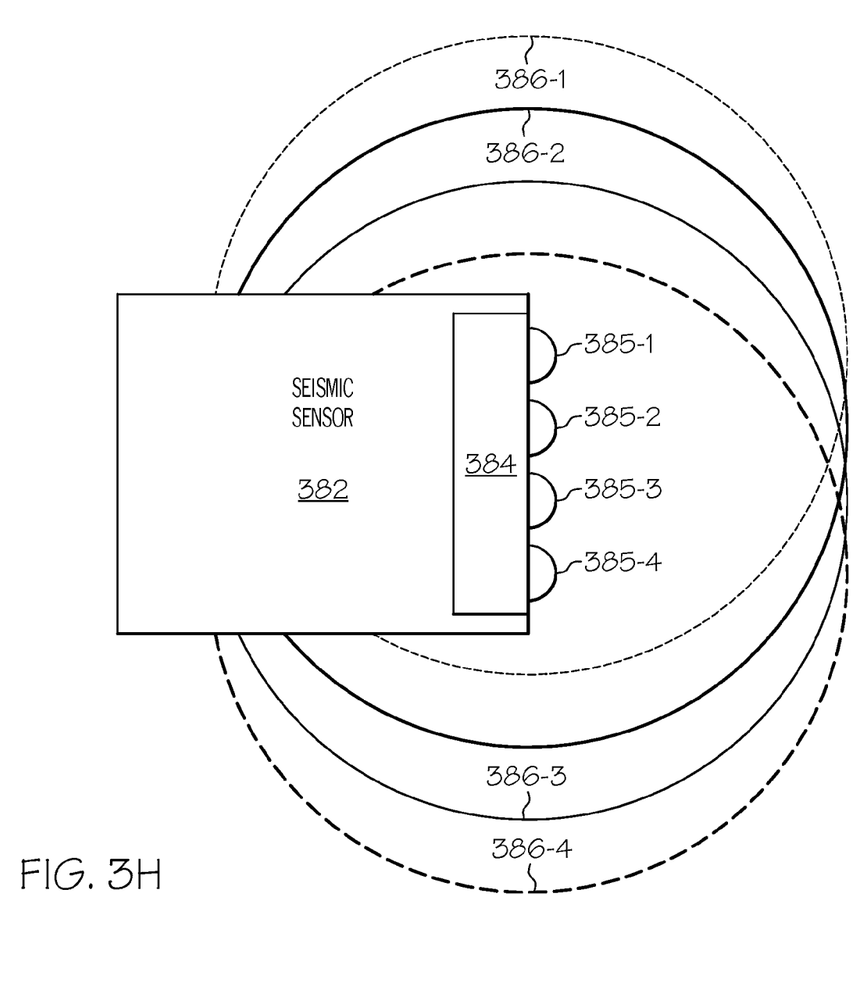

FIG. 3H shows a seismic sensor 382 with a seismic transmitter 384 comprising four transponders 385 producing four distinctly distinguishable seismic events. Each transponder 385 produces a seismic event 386. Transponder 385-1 produces seismic event 386-1, transponder 385-2 produces seismic event 386-2, and so on. The result is a logical four-bit symbol. The CPU in a seismic receiver will perform signal processing on the received seismic activity and will be able to distinguish the seismic activity into the four individual distinguishable seismic events. The distinguishable seismic events may be based on pattern, frequency, or both. A seismic transmitter may include any number of transponders.

Seismic sensors tuned to distill seismic activity into logical bits will be able to send any number of messages. Messages a seismic sensor is likely to communicate include messages indicating the status of an individual sensor, sending a series of numbers or data indicating someone is walking nearby, a vehicle driving, etc., device information, communication and control data, sensor synchronization, sensor timing, and sensor health messages.

Figure 4:
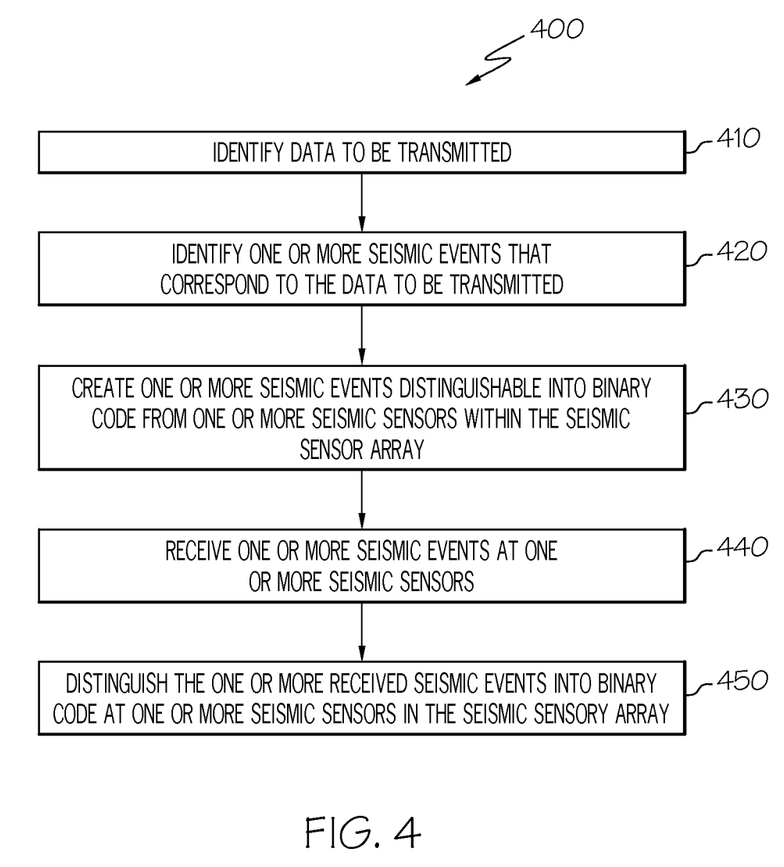
FIG. 4 is a flowchart of one embodiment of a method for communicating with a seismic sensor array.

FIG. 4 is a flowchart of one embodiment of a method 400 for communicating with a seismic sensor array. The method 400 begins with identifying data to be transmitted (block 410). Next, one or more seismic events that correspond to the data to be transmitted are identified (block 420). The seismic sensors in the array should be tuned complementary to each other, that is, a sensor should be able to distinguish between seismic events transmitted by other seismic sensors in the array, and vice-versa. Information may be transmitted by a seismic sensor through creating seismic events distinguishable into binary code (block 430). For example, if a logical 1 is desired, the seismic transmitter will transmit the frequency or pattern assigned to a 1. If a logical 0 is desired, the seismic transmitter will transmit the frequency or pattern assigned to a 0. Also, different numbers of distinctly distinguishable events can be transmitted to produce larger bit symbols (such as two for 2-bits, 8 for 4-bits, and so forth).

The seismic events are received at one or more seismic sensors in the seismic sensor array (block 440). The received seismic events are distinguished and decoded into data bits (block 450). This information may be directly used by the sensor which received it, or the sensor may pass the information on to other seismic sensors by transmitting the seismic events. A seismic sensor may be programmed to not retransmit a message the sensor just transmitted (in order to prevent the same message continually passing between two sensors in the array). If the information is passed on to other seismic sensors, it may ultimately be passed on to a central data unit.

Figure 5A:
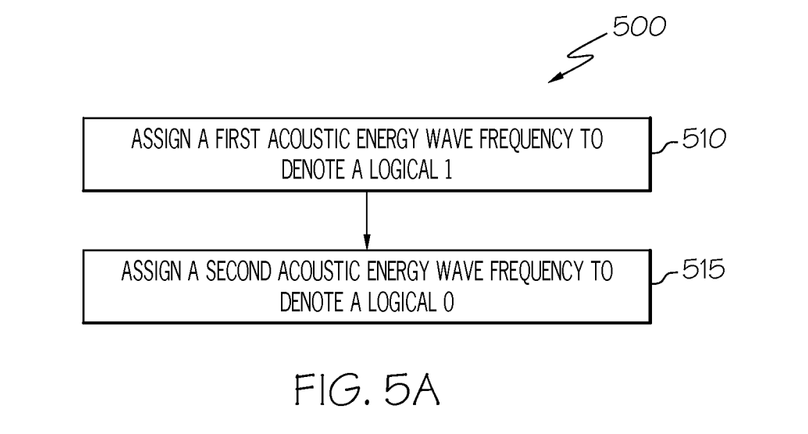
FIGS. 5A and 5B are flowcharts of embodiments of a method for assigning distinguishable seismic events to a logical 1 or a logical 0.
Figure 5B:
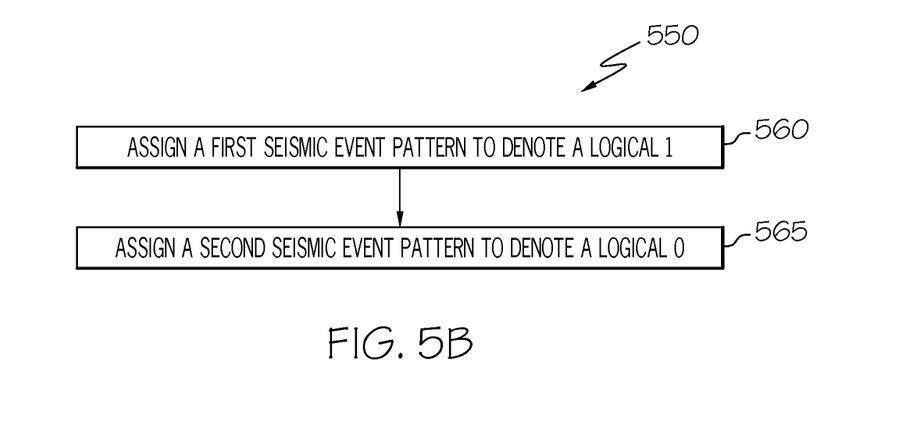

FIGS. 5A and 5B are flowcharts of embodiments of a method for assigning distinguishable seismic events to a logical 1 or a logical 0. Before, or during, the method 400 distinguishable seismic events are assigned to a logical 1 or a logical 0. The seismic events may also be assigned a place in a binary symbol (that is, $2^0$, $2^1$, etc.). The assignment is stored in a memory in the central processing unit of each seismic sensor in an array. As a simple example, FIGS. 5A and 5B only show an assignment for a single bit binary word. However, the method can be extended to apply to multiple-bit binary words.

FIG. 5A shows a method 500 for assigning distinctly distinguishable seismic events based on frequency. A first acoustic energy wave frequency is assigned to denote a logical 1 (block 510). For example, 200 Hz is assigned to be a logical 1 for all the seismic sensors in the array. A second acoustic energy wave frequency is assigned to denote a logical 0 (block 515). For example, 400 Hz is assigned to be a logical 0 for all the seismic sensors in the array. With these assignments, a sensor can transmit a 200 Hz seismic event, and another sensor will receive the 200 Hz seismic event and resolve the wave into a logical 1. The method 500 may be extended beyond only two distinctly distinguishable seismic events to include any number of distinctly distinguishable seismic events.

FIG. 5B shows a method 550 for assigning distinctly distinguishable seismic events based on a seismic event pattern. A first seismic event pattern is assigned to denote a logical 1 (block 510). For example, one event isolated by a period of time (for example, 3 seconds) can be assigned to be a logical 1. A second seismic event pattern is assigned to denote a logical 0 (block 515). For example, two events occurring within a time period (for example, 1 second) can be assigned to be a logical 0. These assignments can be made for all the seismic sensors in the array. Any other number of patterns and variations of patterns can be used as distinctly distinguishable seismic events.

With a seismic sensor array able to transmit, detect, and distinguish seismic events into logical bits, the capacity and reliability for communication in a seismic sensor array is greatly increased. The sensors may be used in remote locations or stealth operations where wireless or wired transmissions are not practical. The non-modulated and primitive acoustic transmission of data between the sensors eliminates the need for wired or wireless transmission and makes the communications more reliable. Using distinctly distinguishable seismic events allows the sensor array to communicate with logical bits.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A seismic communication network, the network comprising:
   a plurality of acoustic sensors, wherein each acoustic sensor comprises:
      a seismic transmitter configured to create acoustic energy waves distinguishable into binary code, wherein the seismic transmitter comprises a plurality of seismic transponders and is configured to transmit a multiple-bit binary word via the plurality of seismic transponders, each seismic transponder of the plurality of seismic transponders being configured to create a seismic event that corresponds to a respective bit of the multiple-bit binary word;
      a seismic detector configured to receive acoustic energy waves; and
      a central processing unit configured to distinguish received acoustic energy waves into binary code.

2. The network of claim 1, further comprising a central data unit, wherein the central data unit is configured to communicate with at least one acoustic sensor of the plurality of acoustic sensors in the network, and wherein the network is configured such that data received at a first acoustic sensor of the plurality of acoustic sensors is transmitted between at least two acoustic sensors of the plurality of acoustic sensors, and transmitted to the central data unit via the at least one acoustic sensor in the network.

3. The network of claim 1, wherein each acoustic sensor of the plurality of acoustic sensors is placed within range of at least one other acoustic sensor of the plurality of acoustic sensors to communicate with the at least one other acoustic sensor.

4. The network of claim 1, wherein the central processing unit is configured to distinguish received acoustic energy waves into binary code by at least distinguishing received seismic events in the received acoustic energy waves, the received seismic events corresponding to places and values of multiple-bit binary words.

5. The network of claim 1, wherein the central processing unit is configured to distinguish received acoustic energy waves by at least:
distinguishing, within the received acoustic energy waves, a first acoustic energy wave frequency that denotes a logical 1; and
distinguishing, within the received acoustic energy waves, a second acoustic energy wave frequency that denotes a logical 0.

6. The network of claim 5, wherein the seismic transmitter is configured to:
create an acoustic energy wave of the first acoustic energy wave frequency if the logical 1 is desired; and
create an acoustic energy wave of the second acoustic energy wave frequency if the logical 0 is desired.

7. The network of claim 1, wherein the central processing unit is configured to distinguish received acoustic energy waves by at least:
distinguishing, within the received acoustic energy waves, a first acoustic energy wave pattern that denotes a logical 1; and
distinguishing, within the received acoustic energy waves, a second acoustic energy wave pattern that denotes a logical 0.

8. The network of claim 7, wherein the seismic transmitter is configured to create acoustic energy waves distinguishable into binary code by at least:
creating the first acoustic energy wave pattern if a logical 1 is desired; and
creating the second acoustic energy wave pattern if a logical 0 is desired.

9. The network of claim 1, further comprising a memory that stores assignments between seismic events and respective binary codes, wherein the central processing unit is configured to distinguish received acoustic energy waves into binary code based on the assignments between the seismic events and respective binary codes.

10. The network of claim 1, wherein the multiple-bit binary word comprises a transmitted multiple-bit binary word, and wherein the received acoustic energy comprises received seismic events, the central processing unit being configured to decode a sequence of the received seismic events into a received multiple-bit binary word.

11. The network of claim 1, wherein the seismic transmitter is configured to simultaneously transmit seismic events corresponding to the bits of the multiple-bit binary word by at least controlling the plurality of seismic transponders to create the respective seismic event at a same time.

12. The network of claim 1, wherein each transponder of the plurality of transponders is tuned to a different frequency.

13. The network of claim 1, wherein at least one of the acoustic sensors of the plurality of acoustic sensors comprises a plurality of seismic transmitters.

\* \* \* \* \*